(12) United States Patent
Kazui et al.

(10) Patent No.: US 8,059,713 B2
(45) Date of Patent: Nov. 15, 2011

(54) VIDEO CODING APPARATUS

(75) Inventors: Kimihiko Kazui, Kawasaki (JP); Yasuhiro Itou, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1477 days.

(21) Appl. No.: 11/461,004

(22) Filed: Jul. 31, 2006

(65) Prior Publication Data

US 2007/0217507 A1    Sep. 20, 2007

(30) Foreign Application Priority Data

Mar. 15, 2006    (JP) .................................. 2006-070170

(51) Int. Cl.
- H04N 7/12     (2006.01)
- H04N 11/02    (2006.01)
- H04N 11/04    (2006.01)
- G06K 9/36     (2006.01)
- G06K 9/46     (2006.01)

(52) U.S. Cl. ................ 375/240.03; 375/240.12; 382/239

(58) Field of Classification Search ............. 375/240.03
See application file for complete search history.

(56) References Cited

U.S. PATENT DOCUMENTS

| | | | |
|---|---|---|---|
| 5,218,435 A | 6/1993 | Lim et al. | |
| 5,283,646 A | 2/1994 | Bruder | |
| 5,434,623 A | 7/1995 | Coleman et al. | |
| 6,792,152 B1 | 9/2004 | Shibata et al. | |
| 2002/0021755 A1* | 2/2002 | Hourunranta | 375/240.12 |
| 2004/0114817 A1* | 6/2004 | Jayant et al. | 382/239 |
| 2004/0202245 A1 | 10/2004 | Murakami et al. | |

FOREIGN PATENT DOCUMENTS

| | | |
|---|---|---|
| CN | 1078841 A | 11/1993 |
| JP | 5-227520 A | 9/1993 |
| JP | 5-308662 A | 11/1993 |
| JP | 5-336513 A | 12/1993 |
| JP | 7-23385 A | 1/1995 |
| JP | 7-107481 | 4/1995 |
| JP | 8-102965 | 4/1996 |
| JP | 10-13859 A | 1/1998 |
| JP | 2001-522174 | 11/2001 |
| JP | 2002-64829 | 2/2002 |
| JP | 2003-284091 A | 10/2003 |
| WO | WO 99/45713 | 9/1999 |
| WO | 01/52550 A1 | 7/2001 |

OTHER PUBLICATIONS

Extended European Search Report issued in corresponding European Patent Application No. 06253987.9 on Sep. 4, 2008. Chinese Office Action issued on Apr. 3, 2009 in corresponding Chinese Patent Application 200610126154.0.
Japanese Office Action mailed on Jun. 14, 2011 for corresponding Japanese Application No. 2006-070170, with partial English-language Translation.

* cited by examiner

*Primary Examiner* — Christopher S Kelley
*Assistant Examiner* — Hee-Yong Kim
(74) *Attorney, Agent, or Firm* — Fujitsu Patent Center

(57) ABSTRACT

A video coding apparatus carries out a compression coding of a video based on a result of predicting a motion vector predicted between frames of the video. A quantization parameter control unit comprised of the apparatus calculates a ratio of an accumulation value, in the small block, of a prediction error of a brightness component to an accumulation value, in the small block, of a prediction error of a color difference component at the time that a motion vector detection/compensation unit which carries out a motion compensation based on a prediction result of the motion vector for the small block designated in a frame of the above video as a prediction accuracy indicator of the foregoing motion vector, and carries out a control of a quantization unit executing a quantization of image information of the small block based on the prediction accuracy indicator.

16 Claims, 4 Drawing Sheets

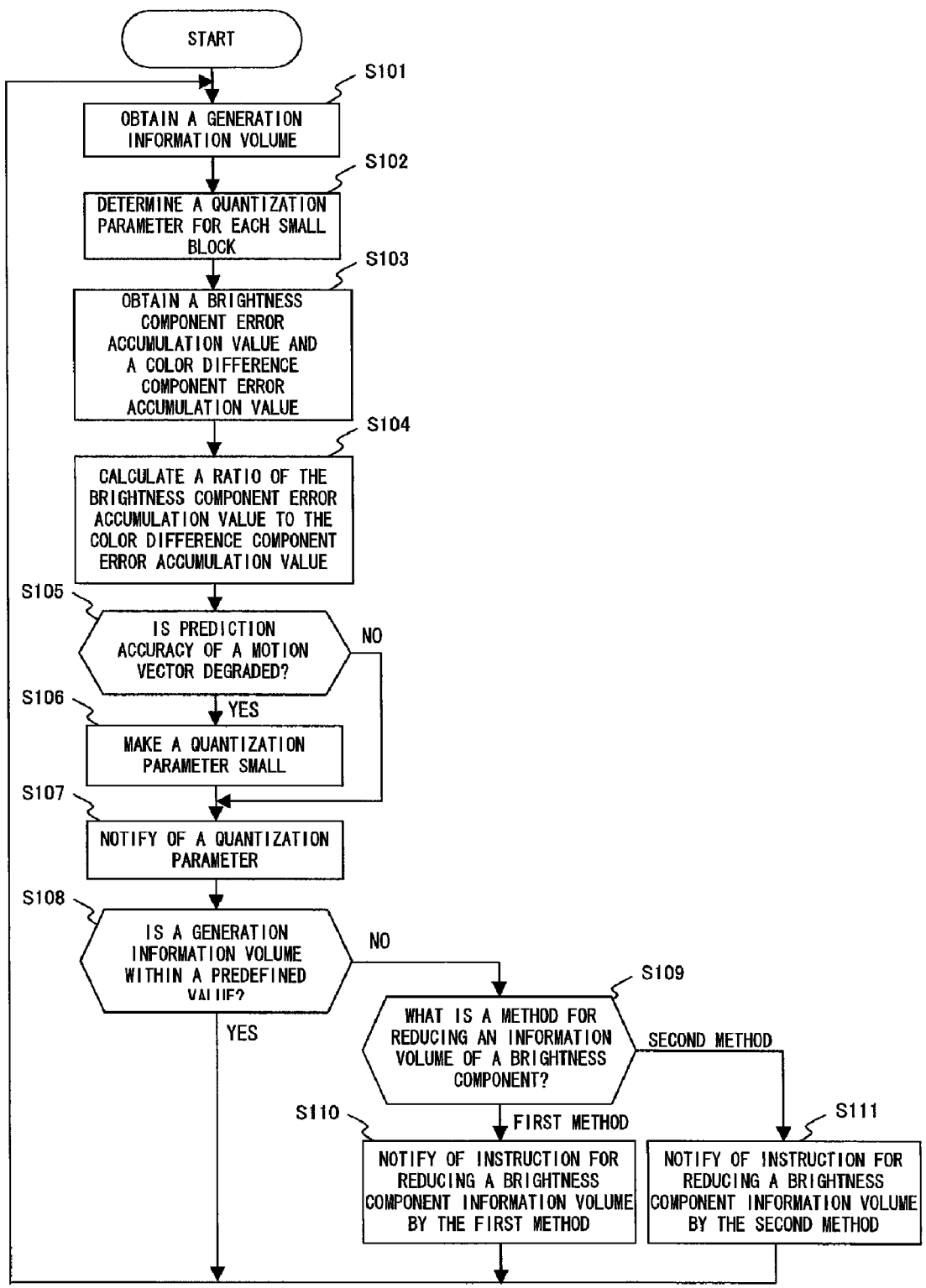
F I G. 3

VIDEO CODING APPARATUS

BACKGROUND OF THE INVENTION

1. Field of the Invention

The present invention relates to a technique for a multimedia encoding and decoding, and in particular to a technique of compression coding for carrying out motion prediction coding between frames by expressing a dynamic color image by a brightness component and a color difference component.

2. Description of the Related Art

An information volume of a video is generally very large, making it highly costly if media accumulation or network transmission is carried out utilizing the original form of the video. Because of this, the development and standardization for compression coding of a video in an encoding or a decoding system has conventionally been tried widely. Representative examples include MPEG-1, MPEG-2, MPEG-4 and AVC/H.264.

The above standards adopt what is referred to as "inter-frame motion prediction coding". Between-frame motion prediction coding is a method of searching for a section of high correlation between frames and then coding the positional difference (i.e., a motion vector) and a pixel value difference (i.e., a prediction error) between a frame and the following frame. This makes it possible to accomplish high compression efficiency because the correlation between sequential frames is generally high in a video, making the pixel difference value become smaller as compared to the original pixel value.

Search and/or determination methods for a motion vector are not specified by the above noted standards. Therefore, the image quality performance of a coding apparatus greatly depends on the prediction accuracy of a motion vector. Meanwhile, the process volume of detection of a motion vector greatly increases with the size of the search range or the number of search positions, and therefore a tradeoff exists between image quality and the circuit size and/or a power consumption of an apparatus.

Only a brightness component is generally used for a detection of a motion vector. This is because the resolution of color difference is finer as compared to that of a brightness component, limiting the degradation of a subjective image quality to a minimum if only the resolution of the color difference part is reduced. This explains why the information ratio Y:Cb:Cr commonly uses a 4:2:0 form, where the Y is for a brightness component and the Cb and Cr are for color difference components in a dynamic color image.

Such a motion vector detection method using only a brightness component does not have difficulties in handling a common image, whereas it allows for degraded prediction accuracy of a motion vector in the case of an image in which a brightness component is uniform (i.e., nonexistence of a texture) and also a texture exists only in a color difference component, possibly resulting in great degradation of a subjective image quality.

The next description is of the above noted problem by referring to FIG. 1.

Screen examples shown in FIG. 1 show a state of a red circular foreground body (which is indicated by a shaded circle) moving from the right to left. Note that, for the purposes of this example, it is assumed that brightness components of the foreground and background are respectively constant, with only color differences being different between them in the screen examples.

Referring to FIG. 1, the row (a) shows an image component of the current frame, and the row (b) shows an image component of the frame at a unit time prior to the current clock time. The dotted line arrow shown in FIG. 1 is the correct motion vector in the example shown by FIG. 1. It is assumed, however, that the motion vector is incorrectly detected as the solid line arrow shown in the drawing due to the brightness component being uniform across the entirety of the screen in the example shown in the drawing. The row (c) of FIG. 1 shows an image component of the frame after compensating a motion that is obtained as a result of the erroneous detection.

A post-motion compensation frame is obtained by subtracting a motion compensation frame from an image component of the current frame. Note that the motion compensation frame is the frame at a unit time prior to the current clock time spatially moved by the amount of a motion vector. As described above, since the motion vector is erroneously detected as the solid line arrow, the motion frame in the example of FIG. 1 is the red foreground body in the frame shown in the row (b) that is moved in the direction opposite to the aforementioned solid line arrow. Having subtracted the motion compensation frame from the current frame shown in the row (a), the post-motion compensation frame allows a cyan-colored (i.e., the complementary color of red) body image (which is expressed by the black circle in FIG. 1) to appear in addition to the red foreground body.

As such, the use of a degree of correlation sometimes results in detecting an erroneous motion vector instead of being able to obtain a correct one in the case when a brightness component is uniform. As a result, the information volume of a post-motion compensation frame (i.e., the frame in the row (c)) becomes larger when compared to that of the original image frame (i.e., frames in the row (a)) as is apparent from FIG. 1. At this juncture, a quantization parameter (i.e., a resolution of a quantization) needs to be increased in order to keep a limit on a bit rate (i.e., a generating information volume), which has been predetermined, resulting in increasing the quantization error of a color difference component, however. Moreover, because the brightness component is uniform in this case, the quantization error of the color difference becomes visually apparent, thereby greatly degrading subjective image quality.

Related to this problem, a Laid-Open Japanese Patent Application Publication No. 08-102965, for example, has disclosed a technique using the total of an accumulation value of the prediction error of a brightness component plus that of the prediction error of a color difference component to determine an accuracy evaluation value of a motion vector when searching a motion vector.

Another conceivable approach to the problem may be to minimize a quantization parameter (i.e., an adaptive quantization) of a small block in which an occurrence of an image degradation is predicted. Techniques for a common adaptive quantization have respectively been disclosed by Laid-Open Japanese Patent Application Publications Nos. 07-107481, 2001-522174 and 2002-64829, for example.

Among these disclosed techniques, the one disclosed in Laid-Open Japanese Patent Application Publication No. 07-107481 is configured to determine a quantization parameter from the activity, evenness, and degree of buffer accumulation of a block. The technique disclosed in Laid-Open Japanese Patent Application Publication No. 2001-522174 is designed to minimize the quantization parameter of a block having a predetermined color such as a human flesh color. Finally, the technique disclosed in Laid-Open Japanese Patent Application Publication No. 2002-64829 is designed to enlarge the information volume of a block referred from a block of another frame.

The technique disclosed in Laid-Open Japanese Patent Application Publication No. 08-102965 always uses a color difference component in searching for a motion vector and therefore the arithmetic operation volume increases when compared to the instance using a brightness component only. This presents a critical problem when implementing a coding apparatus, such as digital camera, that needs suppressing of a circuit size and power consumption.

Furthermore, the techniques disclosed in Laid-Open Japanese Patent Application Publications Nos. 07-107481, 2001-522174 and 2002-64829 also suffer from a problem when producing a prediction of a small block in which a degradation of an image occurs depending on an image.

SUMMARY OF THE INVENTION

Taking into account the problems described above, the purpose of the present invention is to reduce the degradation of subjective image quality in the case where a brightness component is uniform when searching for a motion vector while using only a brightness component.

According to one aspect of the present invention, a video coding apparatus, which carries out compression coding of a video based on a prediction result of a motion vector predicted between frames of the video which is expressed by a brightness component and a color difference component, includes: a brightness component prediction error calculation unit for calculating a prediction error of a brightness component by a motion compensation prediction based on the prediction result of the motion vector for a small block designated in the frame of the video; a color difference component prediction error calculation unit for calculating a prediction error of a color difference component by the motion compensation prediction; a quantization method determination unit for determining a most optimal quantization method from among a plurality thereof based on inputs of the prediction error of the brightness component which is calculated by the brightness component prediction error calculation unit and of the prediction error of the color difference component which is calculated by the color difference component prediction error calculation unit; and a quantization unit for quantizing image data by the quantization method determined by the quantization method determination unit.

This configuration makes it possible to detect a variation in the prediction accuracy of a motion vector and change the accuracy of quantization of a small block according to the detection result, in searching for a motion vector using only a brightness component.

Also according to the present invention, the video coding apparatus described above may be configured in such a manner that the quantization method determination unit indicates a degradation of prediction accuracy of the motion vector as a prediction accuracy indicator when an accumulation value of the color difference component within a small block becomes larger as compared to that of the brightness component within a small block.

This configuration enables a control for improving accuracy of quantization of a small block when the prediction accuracy indicator indicates a degradation of prediction accuracy of a motion vector.

In this event, the configuration may also be such that the quantization method determination unit indicates a degradation of prediction accuracy of the motion vector as a prediction accuracy indicator when a ratio of an accumulation value of the color difference component prediction accuracy within a small block to that of the brightness component within a small block.

This configuration also enables a control for improving accuracy of a quantization of the small block when the prediction accuracy indicator indicates a remarkable degradation of prediction accuracy of the motion vector.

Also according to the present invention, the video coding apparatus described above may be configured in such a manner that the quantization method determination unit controls a quantization parameter in the quantization.

This configuration makes it possible to change the quantization accuracy of a small block.

In this event, the configuration may also be such that the quantization method determination unit makes the quantization parameter smaller when the prediction accuracy indicator indicates a degradation of prediction accuracy of the motion vector.

This configuration improves quantization accuracy of a small block when the prediction accuracy of a motion vector degrades.

In this event, the configuration may also be such that the quantization method determination unit further controls the relevant quantization unit based on an information volume of a compression-coded video, thereby changing the information volume of a brightness component in image information after the quantization. Here, the configuration may be such that the quantization method determination unit applies a control to the quantization unit for reducing the information volume of a brightness component in image information after the quantization, thereby limiting the information volume of the compression-coded video to a predefined threshold value.

This configuration prevents the information volume of a compression-coded video from becoming excessively large by making the quantization parameter small. Moreover, as the main component of an image is a color difference component rather than a brightness component in the case of the brightness component being uniform, therefore a reduction of the information volume of the brightness component only causes a minimal degradation of a subjective image quality.

In this event, the configuration may also be such that control by the quantization method determination unit is one for making a coefficient value of a brightness component, of which an absolute value is smaller than a predefined value as zero ("0") among coefficient values thereof in image information after the quantization.

In this event, an alternative configuration may be such that control by the quantization method determination unit is one for widening a dead zone width for the quantization.

Either of the configurations described above reduces the information volume of a brightness component in image information after a quantization.

As explained above, the present invention is contrived to provide a benefit of reducing a degradation of subjective image quality in the case where a brightness component is uniform and searches for a motion vector only using the brightness component.

BRIEF DESCRIPTION OF THE DRAWINGS

The present invention will be more apparent from the following detailed description when the accompanying drawings are referenced.

FIG. 3 is a diagram showing a flow chart of details of a control process carried out by a quantization parameter control unit.

DESCRIPTION OF THE PREFERRED EMBODIMENTS

Figure 1:
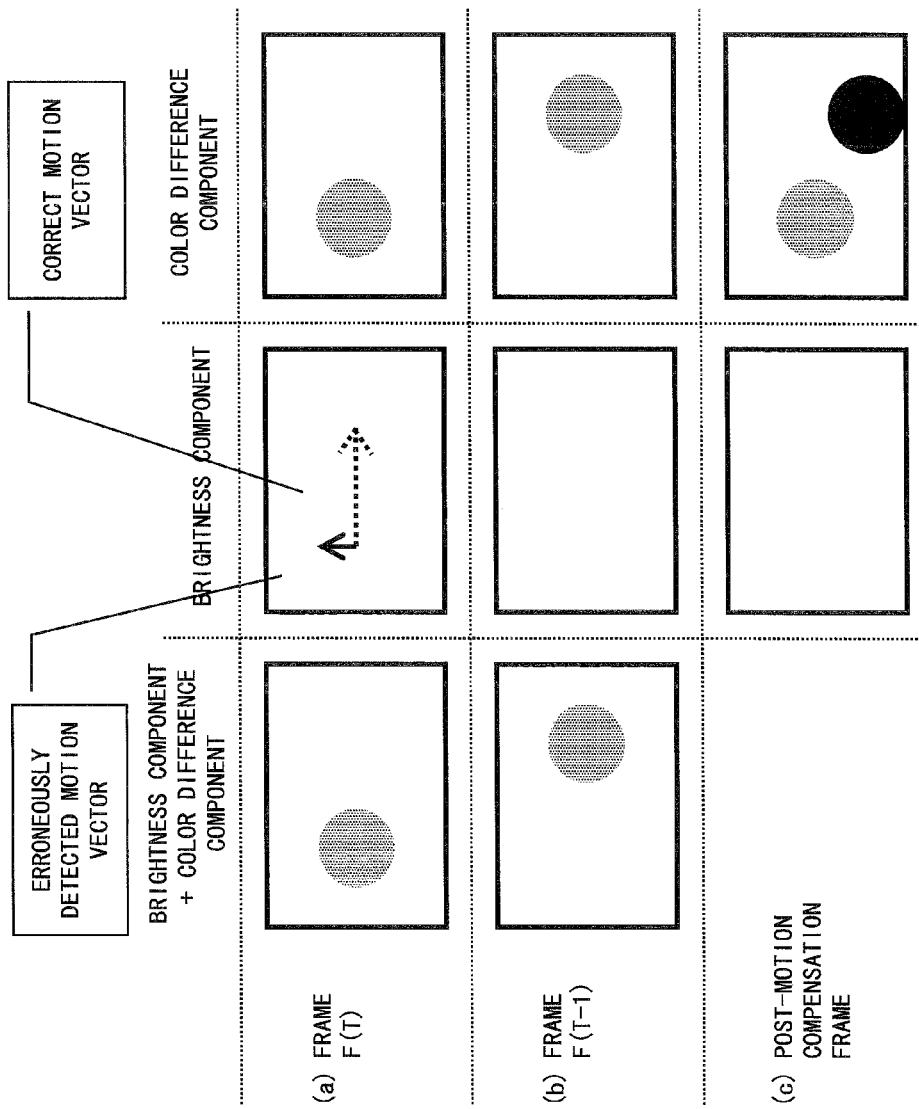
FIG. 1 is a diagram describing problems of a conventional technique.

The first description is of an outline of an embodiment according to the present invention.

In the case where a brightness component is uniform with a texture existing only in a color difference component in a certain small block within a screen, the prediction accuracy of a motion vector degrades. Since the brightness component is uniform in this event, a degradation of prediction accuracy of the motion vector creates a small prediction error accumulation value of the brightness component. Meanwhile, the prediction error accumulation value of the color difference component is relatively large as compared to that of the brightness component.

Accordingly, an embodiment of the present invention is configured to calculate a ratio of a prediction error accumulation value of a brightness component to a prediction error accumulation value of a color difference component as an indicator of prediction accuracy of a motion vector. When the indicator indicates a degradation of the prediction accuracy of a motion vector, the present embodiment is configured to judge it as a small block whose subjective image quality possibly degrades and makes a quantization parameter smaller than other small blocks.

This configuration reduces the influence of making the quantization parameter small if a ratio of the number of small blocks of which the prediction accuracy of a motion vector has degraded to the number of small blocks within a screen is small, thereby improving subjective image quality of the small block of which the prediction accuracy of a motion vector has degraded while maintaining a subjective image quality of other small blocks.

In addition to the above described configuration, a embodiment of the present invention is configured to reduce the information volume of a brightness component by rounding down a post-quantization coefficient of the brightness component in order to prevent the information volume from becoming excessively large as a result of making a quantization parameter smaller in the small block in which the prediction accuracy of a motion vector has degraded. This is because there usually is some amount of prediction error included in, namely, "only a brightness component is uniform" and therefore increased information volume as a result of making the quantization parameter small cannot be ignored in the case of a bit rate being limited. Besides, such a round down causes a minimal degradation of the subjective image quality because the main component of an image is a color difference component rather than a brightness component in such a case.

Note that the provision here is a first method for reducing all values to zero ("0") if the absolute values of post-quantization coefficient are less than a threshold value, and a second method for widening a dead zone for a quantization as a method for rounding down a post-quantization coefficient.

Figure 2:
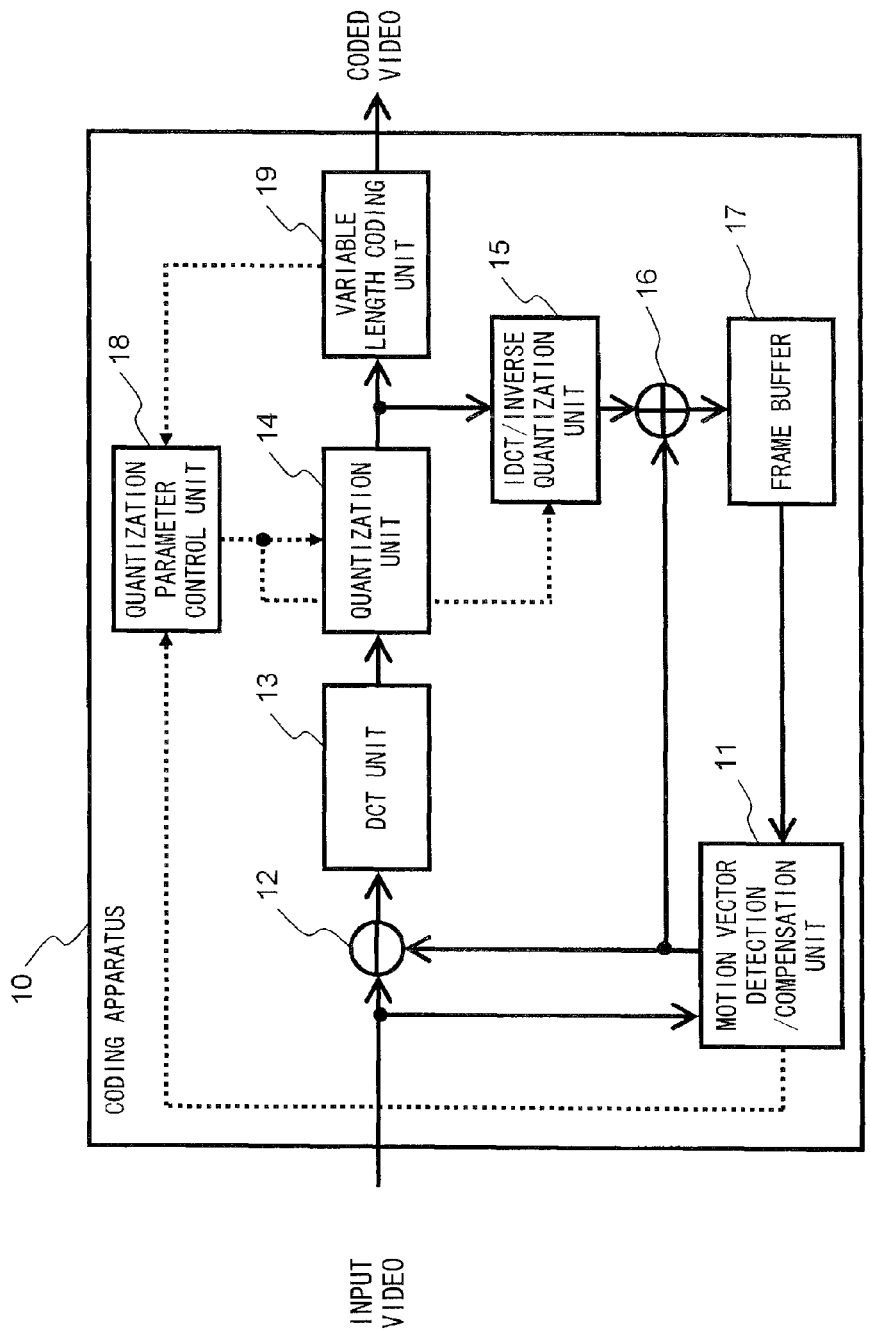
FIG. 2 is a diagram showing a configuration of a coding apparatus embodying the present invention.

The following is a description of an embodiment of the present invention by referring to the accompanying drawings:

First is a description relating to FIG. 2, which illustrates a configuration of a coding apparatus 10 embodying the present invention.

A motion vector detection/compensation unit 11 performs, by using only a brightness component, a prediction of a motion vector between a processing frame of an input video and a reference frame which is stored by a frame buffer 17 and which has been locally decoded in the past, and determines the most optimal motion vector per each of the small blocks of the image. In addition, the unit 11 generates a motion compensation frame based on the aforementioned reference frame and the most optimal motion vector, and outputs it to a subtracter 12. It further notifies a quantization parameter control unit 18 of the accumulated value of the error (simply "error accumulation value" hereinafter) between the processing frame of the input video and generated motion compensation frame separately for a brightness component and for a color difference component.

The error accumulation value SAD_Y of brightness components and error accumulation value SAD_C of color difference components relating to the processing frame of the input video and generated motion compensation frame are calculated as follows:

$$SAD\_Y = \sum_{i=0}^{N-1} |org\_Y[i] - pred\_Y[i]|$$

$$SAD\_C = \sum_{i=0}^{M-1} |org\_Cb[i] - pred\_Cb[i]| + \sum_{i=0}^{M-1} |org\_Cr[i] - pred\_Cr[i]|$$

In the above noted expressions, the org_Y[ ], org_Cb[ ] and org_Cr[ ] are the brightness (Y) component, color difference (Cb) component and color difference (Cr) component, respectively, which are included in a small block of the processing frame of the input video. The pred_Y [ ], pred_Cb [ ] and pred_Cr [ ] are the brightness (Y) component, color difference (Cb) component and color difference (Cr) component, respectively, of a predicted small block based on a detected motion vector. Meanwhile, the N and M are the numbers of respective samples of the brightness (Y) components and color difference (Cb and Cr) components which are included in the small block.

The subtracter 12 performs a subtraction process between a processing frame of the input video and a motion compensation frame output from the motion vector detection/compensation unit 11.

A DCT unit 13 carries out a frequency conversion by applying a discrete cosine transform (DCT) operation to a prediction error pixel output from the subtracter 12.

A quantization unit 14 carries out a quantization process for the frequency-converted prediction error pixel according to a quantization parameter and an instruction for a reduction of a brightness component information volume that are handed from the quantization parameter control unit 18.

An IDCT/inverse quantization unit 15 applies an inverse quantization process and an inverse discrete cosine transform (IDCT) operation to the output of the quantization unit 14 by using the quantization parameter handed from the quantization parameter control unit 18.

An adder 16 generates a local decode frame by adding the output of the IDCT/inverse quantization unit 15 and that of the motion vector detection/compensation unit 11.

The frame buffer 17 is memory temporarily retaining the local decode frame output from the adder 16.

The quantization parameter control unit 18 determines a quantization parameter and also issues an instruction to the quantization unit 14 for reducing a brightness component information volume if required by the aforementioned determination value.

A variable length coding unit 19 applies a variable length coding to the frequency-converted, quantized motion prediction error pixel value.

The next description is relative to FIG. 3, which shows a flow chart of a detail of a control process carried out by the quantization parameter control unit 18.

Referring to FIG. 3, first, the S101 carries out a process for obtaining generation information volume at the variable length coding unit 19, and the subsequent S102 carries out a process of calculating a quantization parameter, constituting a basis, by each small block of an image based on the obtained generated information volume. The quantization parameter QP can be calculated by a various known method as a rate management method strictly observing a bit rate limitation. For instance, the method disclosed in the above listed Laid-Open Japanese Patent Application Publication No. 07-107481, No. 2001-522174 or No. 2002-64829 can be utilized.

Likewise, the processes in S103 and thereafter are carried out for each small block of the image.

Then S103 carries out a process for obtaining an error accumulation value SAD_Y of brightness components and an error accumulation value SAD_C of color difference components which are notified from the motion vector detection/compensation unit 11, and the subsequent S104 carries out a process for calculating the above described motion vector prediction accuracy indicator, that is, a ratio of the obtained error accumulation value of brightness components SAD_Y to error accumulation value of color difference components SAD_C. Then the subsequent S105 carries out a process for judging whether or not the aforementioned indicator indicates a degradation of the prediction accuracy of the motion vector.

Note that a judgment of whether or not a quantization parameter QP is to be smaller may be made according to whether or not the following expression is valid:

$$(SAD\_Y * TH) < SAD\_C;$$

where the TH is an externally provided parameter. That is, in the case of the above noted expression being valid, the ratio of an error accumulation value of color difference components SAD_C to an error accumulation value of brightness components SAD_Y (i.e., (SAD_C)/(SAD_Y)) is larger than a predefined threshold value. Accordingly, this is precisely the case where prediction accuracy of a motion vector shall be determined as degraded according to the present invention. Incidentally, the above described 4:2:0 formed color image is for instance provided with "3" as a value of the TH.

If the prediction accuracy of the motion vector is judged to be degraded in the judgment process in the S105 (i.e., the judgment result being "yes"), the S106 applies a reduction process represented by the following expression to the quantization parameter QP calculated based on the generation information volume at the variable length coding unit 19:

$$QP' = QP - \text{Offset}$$

Note that a value of the Offset in the above noted expression uses "6" (e.g., in the case of the AVC/H.264). Then the subsequent S107 carries out a process for notifying the quantization unit 14 and IDCT/inverse quantization unit 15 of the quantization parameter QP' obtained by the above expression.

Contrarily, if the prediction accuracy of the motion vector is determined "not degraded" in the judgment process of S105 (i.e., the judgment result being "no"), the process proceeds to S107—without performing the process of S106—for carrying out the process for notifying the quantization unit 14 and IDCT/inverse quantization unit 15 of the quantization parameter QP which has been calculated in the process of S102.

Then, the S108 carries out the process for judging whether or not the generation information volume obtained by the process of S101 is within a predefined value (e.g., a bit rate predefined for the coding apparatus 10). If it is judged to be within the predefined value (i.e., the judgment result being "yes"), the process returns to the S101 followed by repeating the above described processes. Contrarily, if it is judged not to be within the predefined value (i.e., the judgment result being "no"), the process proceeds to the S109.

The S109 carries out the process for judging whether the above described first method or second method is what is preset for the coding apparatus 10 as a method for reducing a generation information volume of a brightness component after a quantization. In this event, if the first method is preset, the S110 carries out the process for notifying the quantization unit 14 of an instruction for reducing an information volume of the brightness component by changing all post-quantization coefficients whose absolute values are smaller than a threshold (e.g., "1") to zero ("0"). Comparably, if the second method is preset, the S111 carries out the process for notifying the quantization unit 14 of an instruction for reducing an information volume of the brightness component by widening a dead zone width for a quantization.

Next is a further description of the second method for reducing the information volume of a brightness component by widening a dead zone width for a quantization. A process of quantization by the quantization unit 14 can be expressed by the following expression for example:

$$c' = (c + (dz << (QP-1))) >> (QP)$$

In the above expression, the "<<" represents a left bit shift, while the ">>" represents a right bit shift. The c is a pre-quantization coefficient, and c' is a post-quantization coefficient. The QP is a quantization parameter and the above expression represents a quantization of the coefficient c by a $2^{QP}$ value. Incidentally, "dz" is a parameter for determining a dead zone width for a quantization. Here, making a value of dz smaller widens a dead zone width, and the post-quantization coefficient becomes smaller.

In the above noted expression, assume the case in which c=6 (which is "110" in a binary number), QP=3 and dz=0.5. In this case, (dz<<(QP-1))=2 (which is "10" in a binary number), and therefore (c+(dz<<(QP-1)))=8 (which is "1000" in a binary number). Therefore, c'=1 (which is also "1" in a binary number).

Meanwhile, also assume the case in which dz=0.25 by widening the dead zone width in the above described case. Since (dz<<(QP-1))=1 (which is also "1" as a binary number) in this case and therefore, (c+(dz<<(QP-1)))=7 (which is "111" in a binary number). Accordingly, c'=0. This is a manner for suppressing the post-quantization information volume of a brightness component as a result of making a quantization parameter small.

When the process of the above described S110 or S111 finishes, S110 or S111, the process returns to S101 for repeating the above-described processes.

The quantization parameter control unit 18, in carrying out the above described processes determines a quantization parameter and instructs the quantization unit 14 for a reduction of a brightness component information volume, if required by the aforementioned determination value.

The coding apparatus 10, configured as illustrated by FIG. 2, operates as described above, and therefore reduces degradation of subjective image quality in a part in which prediction accuracy of a motion vector, due to only the brightness component being uniform (even if only a brightness component), is used for detecting a motion vector because of limitation, et cetera, of a circuit size or power consumption.

Figure 4:
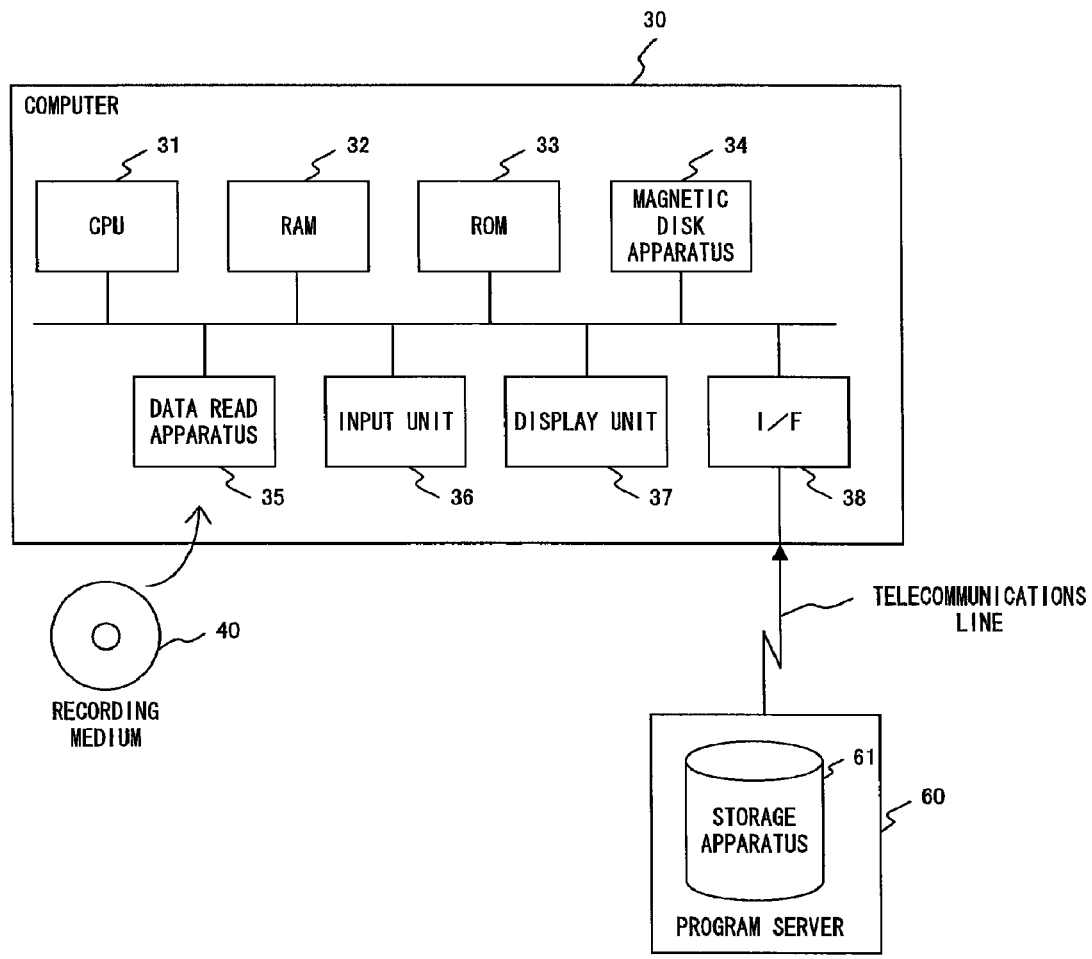
FIG. 4 is a diagram exemplifying a configuration of a computer embodying the present invention.

Note that encoding of a video carried out by the coding apparatus 10 shown by FIG. 2 can be carried out by a computer with a standard configuration, that is, by a computer 30 which comprises a CPU (central processing unit) 31 for administering operation control of the entirety of the computer 30, RAM 32 (random access memory) used for work by the CPU 31 as required at the time of carrying out various processes, ROM 33 (read only memory) pre-storing a basic control program executed by the CPU 31 and various kinds of data used at the time of executing the program on an as required basis, a magnetic disk storage apparatus 34 storing various control programs executed by the CPU 31 and various kinds of data used at the time of executing the program on an as required basis, a data reading apparatus 35 for reading various kinds of data recorded in a portable recording medium 40 such as CD (compact disk), MO (magneto optical) disk and DVD (digital versatile disk) for example, an input unit 36, comprising a pointing device, such as mouse apparatus, and a keyboard apparatus, et cetera, for obtaining an user instruction corresponding to the content of an operation thereon, a display unit 37 for displaying a prescribed image according to a CPU instruction and an I/F (interface) unit 38 for exchanging various kinds of data with other equipments as shown by FIG. 4.

In order to embody the present invention by such a configured computer 30, it is only necessary to generate a control program and store it in the above described portable recording medium 40 for making the CPU 31 of the computer 30 carry out the control process shown in FIG. 3. These processes are carried out by the quantization parameter control unit 18 according to the above described embodiment, followed by making the computer 30 read the control program and having the CPU 31 execute the program.

Incidentally, an alternative configuration may exist in which a storage medium for storing the above described control program uses a storage apparatus 61 comprised by a computer system functioning as a program server 60. This computer system (program server 60) is connected to a telecommunications line 50 (e.g., the Internet) in place of the portable recording medium 40. A configuration in this case may be such as to transmit a transmission signal, which is obtained by modulating a carrier wave by a data signal expressing the above described control program, to the computer 30 from the program server 60 by way of the telecommunications line 50 that is a transmission medium. At the computer 30, a reception of the transmission signal and a reproduction of the original control program through a demodulation enable the CPU 31 to execute the control program.

While the embodiment of the present invention is described above, the present invention is in no way limited thereby.

What is claimed is:

1. A video coding apparatus carrying out a compression coding of a video based on a prediction result of a motion vector which is predicted between frames of the aforementioned video which is expressed by a brightness component and a color difference component, comprising:
   a brightness component prediction error calculation unit which calculates a prediction error of a brightness component by a motion compensation prediction based on the prediction result of the motion vector for a small block designated in the frame of the video;
   a color difference component prediction error calculation unit which calculates a prediction error of a color difference component by the motion compensation prediction;
   a quantization method determination unit which determines a most optimal quantization method from among a plurality thereof, based on inputs of the prediction error of the brightness component which is calculated by the brightness component prediction error calculation unit and of the prediction error of the color difference component which is calculated by the color difference component prediction error calculation unit; and
   a quantization unit which quantizes image data by the quantization method determined by the quantization method determination unit, wherein
   the quantization method determination unit indicates a degradation of a prediction accuracy of the motion vector as a prediction accuracy indicator when an accumulation value of a prediction error of the color difference component within the small block becomes larger than an accumulation value of a prediction error of the brightness component within the small block and when a ratio of the accumulation value of the prediction error of the color difference component within the small block to the accumulation value of the prediction error of the brightness component within the small block becomes larger than a predefined threshold value.

2. The video coding apparatus according to claim 1, wherein
   the quantization method determination unit controls a quantization parameter in a quantization at the quantization unit.

3. The video coding apparatus according to claim 2, wherein
   the quantization method determination unit makes said quantization parameter smaller when judging that a prediction accuracy of said motion vector is degraded.

4. The video coding apparatus according to claim 3, wherein
   the quantization method determination unit further controls the quantization unit based on an information volume of a video which has been compression-coded, thereby changing an information volume of a brightness component in image information after the quantization.

5. The video coding apparatus according to claim 4, wherein
   the quantization method determination unit carries out a control for reducing the information volume of a brightness component in image information after the quantization for the quantization unit, thereby limiting the information volume of the compression-coded video within a threshold value.

6. The video coding apparatus according to claim 5, wherein
   the control applied by the quantization method determination unit is one for reducing, to zero ("0"), a coefficient value whose absolute value is smaller than a predefined value among the aforementioned coefficient values of a brightness component in the post-quantization image information.

7. The video coding apparatus according to claim 5, wherein
   the control applied by the quantization method determination unit is one for widening a dead zone width for the quantization.

8. A computer readable non-transitory recording medium recording a program which directs a computer to carry out a compression coding of a video using a prediction result of a motion vector which is predicted between frames of the aforementioned video expressed by a brightness component and a color difference component, the program directing a process comprising:

calculating a prediction error of a brightness component by a motion compensation prediction based on the prediction result of the motion vector for a small block designated in the frame of the video;

calculating a prediction error of a color difference component by carrying out the motion compensation prediction;

determining a most optimal quantization method from the prediction error of the brightness component and that of the color difference component; and quantizing image data by the determined quantization method, wherein the determining the quantization method indicates a degradation of a prediction accuracy of the motion vector as a prediction accuracy indicator when an accumulation value of a prediction error of the color difference component within the small block becomes larger than an accumulation value of a prediction error of the brightness component within the small block and when a ratio of the accumulation value of the prediction error of the color difference component within the small block to the accumulation value of the prediction error of the brightness component within the small block becomes larger than a predefined threshold value.

9. The recording medium according to claim 8, wherein a quantization parameter in the quantizing the image data for said is controlled by the determining the quantization method.

10. The recording medium according to claim 9, wherein the quantization parameter in the quantizing the image data is made smaller if a prediction accuracy of the motion vector is determined to be degraded in the determining the quantization method.

11. The recording medium according to claim 10, wherein the control for a quantization in the determining the quantization method further changes an information volume of a brightness component in image information after the aforementioned quantization using an information volume of a compression-coded video.

12. The recording medium according to claim 11, wherein the control for a quantization in the determining the quantization method applies a control for reducing the information volume of a brightness component in image information after the aforementioned quantization, thereby limiting the information volume of the compression-coded video within a predetermined threshold value.

13. The recording medium according to claim 12, wherein the control for a quantization in the determining the quantization method is one for reducing, to zero ("0"), a coefficient value whose absolute value is smaller than a predefined value among the aforementioned coefficient values of a brightness component in image information after the aforementioned quantization.

14. The recording medium according to claim 12, wherein the control for a quantization in the determining a quantization method is one for widening a dead zone width for the aforementioned quantization.

15. A method for carrying out a compression coding of a video using a prediction result of a motion vector which is predicted between frames of the aforementioned video expressed by a brightness component and a color difference component, comprising:

calculating a prediction error of a brightness component by a motion compensation prediction using the prediction result of the motion vector for a small block designated in a frame of the video;

calculating a prediction error of a color difference component by carrying out the motion compensation prediction;

determining a most optimal quantization method from the prediction error of the brightness component and that of the color difference component; and quantizing image data using the determined quantization method, wherein the determining the quantization method indicates a degradation of a prediction accuracy of the motion vector as a prediction accuracy indicator when an accumulation value of a prediction error of the color difference component within the small block becomes larger than an accumulation value of a prediction error of the brightness component within the small block and when a ratio of the accumulation value of the prediction error of the color difference component within the small block to the accumulation value of the prediction error of the brightness component within the small block becomes larger than a predefined threshold value.

16. The method according to claim 15, wherein a quantization parameter in the quantizing the image data is controlled by the determining the quantization method, and the control for a quantization in the determining the quantization method further changes an information volume of a brightness component in image information after the aforementioned quantization using an information volume of a compression-coded video.

* * * * *